April 14, 1953  D. SILVERMAN  2,634,610
ACCELERATION-COMPENSATED SYSTEM
Filed Dec. 19, 1949  2 SHEETS—SHEET 1
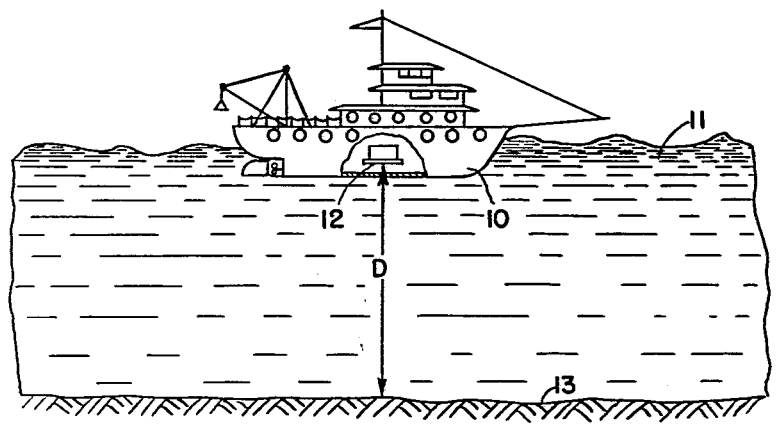
Fig.1
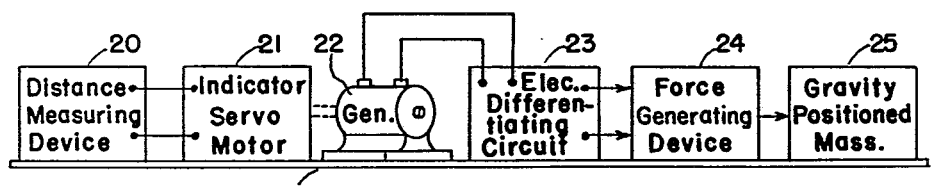
Fig.2
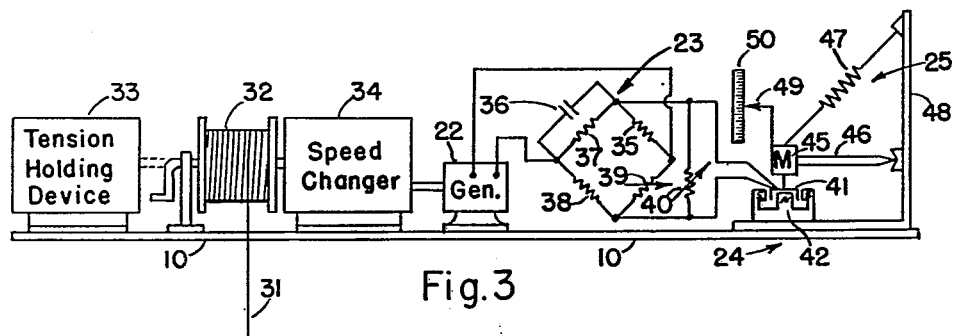
Fig.3
*INVENTOR:*
Daniel Silverman
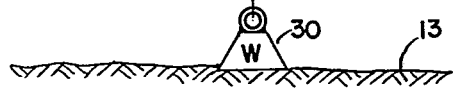
ATTORNEY

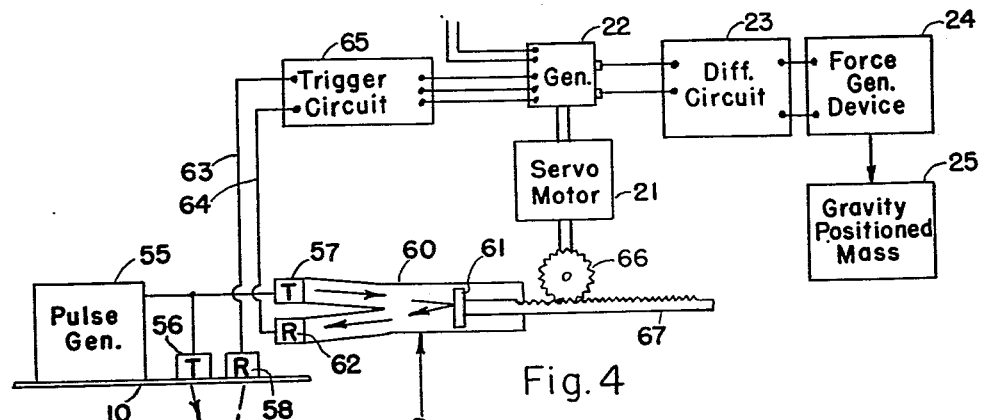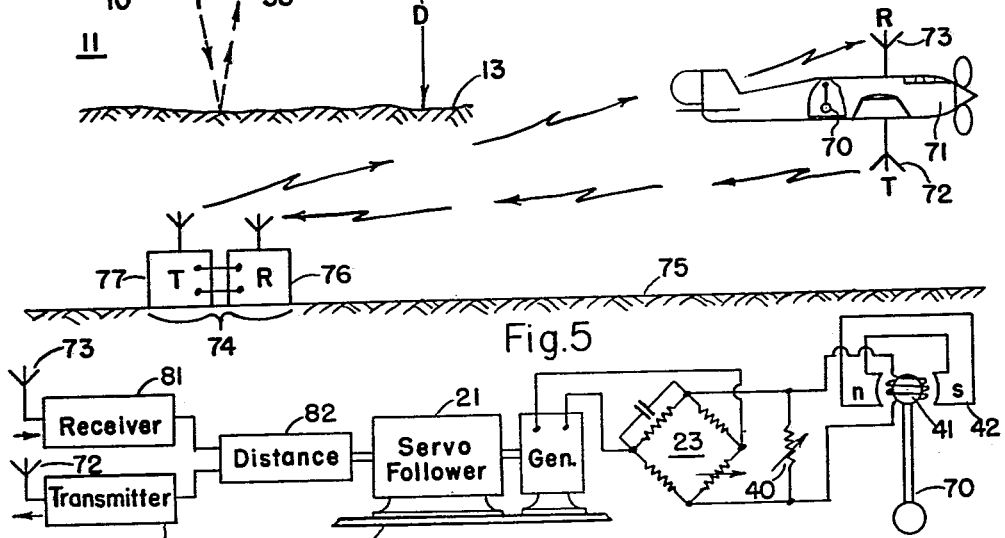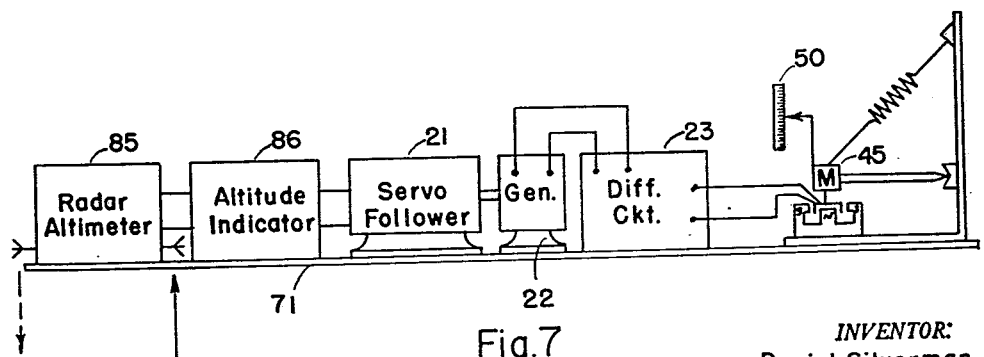

Patented Apr. 14, 1953

2,634,610

UNITED STATES PATENT OFFICE 2,634,610

ACCELERATION-COMPENSATED SYSTEM

Daniel Silverman, Tulsa, Okla., assignor to Stanolind Oil and Gas Company, Tulsa, Okla., a corporation of Delaware Application December 19, 1949, Serial No. 133,731

9 Claims. (Cl. 73—382)

This invention relates to the compensation of pivoted or spring-supported mass systems for the effects of acceleration of a carrying or transporting vehicle and is directed particularly to the compensation of horizontal or vertical pendulums or spring-supported masses mounted in a carrier, such as a ship or an airplane, for accelerations of the carrier which cause the mass to move relative to its supporting frame due to the mass inertia.

Numerous occasions arise when it is desirable to make measurements or obtain indications from a gravity-positioned mass system on a moving vehicle such as a ship or an airplane. For example, there are occasions when it is desirable to make measurements of the value of gravity on a ship at sea for such purposes as latitude determination. Measurements of the value of gravity in an airplane can be utilized for a similar purpose. It is likewise sometimes desirable to obtain an indication of the true vertical in an airplane by means of a gravity-oriented vertical pendulum, but in all such cases the position assumed by the suspended- or pivoted-mass system under the influence of gravity is subject to disturbance by accelerations of the transporting vehicle in a direction at right angles to the pendulum arm and axis of rotation.

A primary object of my invention, therefore, is a novel and improved method and apparatus for compensating a gravity-responsive mass, carried by a transporting vehicle, for accelerations of the vehicle which cause movements or rotations of the mass. Another object of the invention is a compensated gravity-responsive system which is capable of utilizing accurately performed measurements of distance and applying them to the compensation of the suspended system. It is a further object of the invention to provide, for compensation of a gravity-responsive mass in a moving vehicle, a method and apparatus by which position or distance measurements of said vehicle relative to a fixed reference position are transformed into electrical quantities which are utilized to compensate for the accelerations of the vehicle. Other objects, uses, and advantages of the invention will become apparent as the description proceeds.

Stated generally, the method and apparatus of my invention for compensating a gravity-responsive mass in the form of a horizontal, vertical, or inverted pendulum or spring-supported mass mounted on a moving or movable vehicle such as a ship or airplane, adapted to travel through a fluid medium such as water or air, comprises accurately and substantially continuously measuring the distance from the vehicle to a reference position on the earth fixed relative to the fluid medium in which the vehicle is traveling, which distance measurement is performed or resolved in a direction generally parallel to that motion of the vehicle which disturbs the position of the mass, transforming the distance measurement into some quantity such as an electrical current or voltage which is then differentiated to obtain a resultant signal proportional to the acceleration in said direction, and then applying the acceleration signal to the gravity-responsive system through a device which applies to the mass a compensating force opposing its displacement due to the vehicle acceleration.

This will be better understood by reference to the accompanying drawings forming a part of this application, in the different figures of which drawings the same reference numerals are applied to the same or corresponding parts. In these drawings:

Figure 1 is a diagrammatic illustration of a vessel transporting a gravity-responsive device subject to vertical accelerations;

Figure 2 is a generalized diagram of the acceleration-compensating system of the invention;

Figure 3 shows diagrammatically in more detail one embodiment of the invention adapted to correct for vertical accelerations of a vessel in a body of water;

Figure 4 shows a modification of the embodiment of Figure 3 with a preferred depth-measuring means;

Figure 5 shows schematically an embodiment of the invention for compensation of a vertical reference pendulum in an airplane;

Figure 6 shows diagrammatically in further detail the compensating system used in Figure 5; and Figure 7 shows a modification of the invention for compensating a horizontal pendulum in an airplane.

Referring now to the drawings and particularly to Figure 1, a vessel 10 floating on a body of water 11, shown in cross-section and of depth D, carries a compensated gravity-measuring system designated generally by the numeral 12. The measuring system 12 is preferably located as nearly as possible at the center of motion of the vessel 10 in the water so that the effects of pitching and rolling of the vessel on the measuring system are minimized. However, there remains the rising and falling motion of the vessel 10 as a whole relative to the marine bottom 13, which motion produces an effect on the gravity-positioned mass of the measuring system. This appears as an acceleration adding to or subtracting from the acceleration of gravity to be measured.

The effect of this rising and falling motion of vessel 10 is preferably compensated by the system shown generally in Figure 2. Thus, a distance-measuring device 20 continuously determines the value of the distance D and indicates the resultant measurement in some suitable fashion. This measurement is fed into a follower or servo-motor system 21 capable of following the indication accurately and providing power for the elements of the compensating system following it. Servo-motor 21 thus drives an electric generator 22 of a type which produces an output proportional to the speed at which it is driven. This output, consequently, is proportional, not to the distance D, but to the rate of change of the distance and therefore represents its velocity. The output of generator 22 is then applied to an electrical differentiating circuit 23 which produces an output that is proportional to the accelerations producing the changes in distance measured by the device 20. The electrical signal thus obtained is applied to a force-generating device 24 operating on the gravity-positioned mass of the measuring system 12, and by choice of the proper magnitude of force from the device 24, the gravity-positioned mass 25 is substantially prevented from deflecting due to the accelerations causing the motion of vessel 10, and the reading obtained is a relatively steady one.

A compensating and measuring system of this type is shown in further detail in Figure 3. For occasions where the measurement of depth D can be made with the vessel 10 at a stationary location in the water, a weight 30 is lowered to the marine floor 13 attached to a cable 31 wound on a reel 32 mounted on the vessel 10. After lowering of weight 30 to the marine floor 13, the line 31 is maintained taut by a tension-holding device 33, which allows rotation of the reel 32 as the vessel 10 moves vertically up and down relative to the weight 30. This rotation of the reel 32 is transmitted through a suitable speed-changing mechanism 34 to the electric generator 22, which produces an electrical output proportional to the rate of change of the distance D as it is determined by the reeling in or paying out of the cable 31. This electrical output is differentiated by a network consisting generally of a series resistor 35 and condenser 36, which are preferably arranged in a bridge circuit including also the resistors 37, 38, and 39, which circuit compensates for the leakage resistance of condenser 36. After magnitude adjustment by a variable shunt resistance 40, the output of this bridge circuit, which is essentially the voltage appearing across the resistance 35, is applied to a coil 41 in the field of a permanent magnet 42. In this case, the gravity-positioned mass 45 is fixed to a pivoted beam 46 and supported by a spring 47 from a vertical frame 48. The mass position under the influence of acceleration and gravity forces is ascertained by an index 49 and a stationary scale 50. By attaching the coil 41 to the mass 45 or to the beam 46, a varying force is applied to the suspended-mass system such that the varying accelerations due to the rising and falling of the vessel 10 are accurately compensated. Consequently, the reading of the index 49 on the scale 50 is a relatively steady reading indicating the value of the force of gravity alone. While a beam-type gravity meter has been described, it is clear that the invention is equally applicable to compensating the simplest possible type of gravity meter consisting of only a mass and a spring.

Although, because of the extreme accuracy necessary, it is difficult to devise a compensating system sufficiently accurate to permit use of the readings of the gravity meter for geophysical surveying purposes, there are many other uses such as in latitude determination, where the readings of a system such as that described are sufficiently accurate to be of value.

In Figure 4 is shown a modification of the system of Figure 3 useful when the vessel 10 is in motion over a body of water of relatively constant depth, or when for other reasons it is impractical to make a direct depth measurement by means such as the cable 31 and sounding weight 30. In this embodiment an acoustic or sonic depth-determining system is provided, consisting of a generator 55 of electrical pulses which are applied to a pair of transmitting transducers 56 and 57. The sonic pulse from the transducer 56 is radiated through the body of water 11 and reflected from the bottom 13 to a suitably located detector 58 on the vessel 10. The acoustic pulse from the transducer 57 is preferably transmitted through the air column of a tubular member 60 to a reflecting surface 61 and returned to a detector 62 adjacent but shielded from the transducer 57. Electrical pulses from the respective detectors 58 and 62 are transmitted by suitable leads 63 and 64 to a trigger circuit 65, which is actuated in different senses depending upon which of the receivers 58 or 62 first receives a reflected pulse. This trigger circuit 65 controls the direction of rotation of the servo-motor 21 which, by means of the pinion 66 and rack mechanism 67, varies the position of the reflecting surface 61 in the tube 60 so that the length of the air path in the tube 60 is proportional to the depth D of the water body 11. Servo-motor 21 drives the generator 22, which feeds the differentiating circuit 23 and force-generating mechanism 24 acting on the gravity-positioned mass 25, in the manner described in connection with Figure 3. The obvious advantage of this system over that of Figure 3 is, of course, that the vessel 10 need not be completely at rest, but may have more or less motion or actually proceed along a given course if the marine bottom 13 is sufficiently level.

In Figure 5 is shown schematically an application of the invention to the compensation of a vertical pendulum mounted in a horizontally moving vehicle such as an airplane for which a stabilized vertical reference member is desired. To simplify the explanation, it will be assumed that the vertical pendulum 70 is mounted in the airplane 71 with an axis of rotation which is horizontal and transverse to the line of flight. The airplane 71 is provided with separated transmitting and receiving antennas 72 and 73 which, in conjunction with other equipment within the plane, are adapted for continuously measuring the distance from the plane to a known stationary reference position 74 on the ground surface 75. At reference position 74 are a receiver 76 and transmitter 77 forming a beacon or transponder system for retransmitting a signal received from the transmitting antenna 72 back to the receiving antenna 73 on the plane and, by the signal transit time, continuously indicating the distance of the plane from location 74.

Further details of the installation on the plane 7I are shown in Figure 6. Thus, a transmitter 80 energizes the antenna 72 while the receiving antenna 73 is coupled to a receiver 81 which, with the transmitter 80, actuates a distance-indicating mechanism 82. The indication so produced is followed by the servo-mechanism 21 operating in the manner previously described to drive the generator 22 and feed the differentiating circuit 23, applying, by means of a coil 41 suitably attached to the pendulum 70 and in the field of magnet 42, a compensating torque to the pendulum 70 opposing its tendency to rotate during periods of acceleration and deceleration of the airplane 71, as detected by the distance-measuring system. It should be understood that the particular radio distance-measuring system employed is only representative of a number of such systems which may be used and are described in greater detail in the art. One system that is particularly desirable because of the great accuracy of distance measurement provided is that known commercially as the "Raydist" system and described by C. J. Deegan in an article appearing at page 69 of the Oil and Gas Journal dated July 7, 1949.

It will also be understood that a correction factor $1/\cos \theta$ must be applied to the distance, velocity, or acceleration indication or voltage, if the line of flight of craft 71 is not directly to or from the reference position 74 but is at an angle $\theta$ relative to the line between the plane 71 and the reference 74. It will be further understood that a vertical reference pendulum which is freely suspended so that it is also subject to horizontal accelerations of the airplane 71 transverse to the line of flight, or a second pendulum suspended with its rotational axis parallel to the line of flight, will require a second compensating system independent of the one which has been described to provide the other component of compensation. Ordinarily vertical acceleration components will not require compensation.

A system analogous to those of Figures 3 and 4 is applicable to the compensation of a horizontal pendulum or gravity meter mounted in an airplane, as shown in Figure 7; and, in this case, vertical accelerations are of primary concern. Thus the height of the plane 71 above a water surface or a substantially flat land surface is continuously measured by a radar or other type of electronic altimeter 85, producing an altitude indication on the indicator 86. The servo-follower 21 follows variations of this indication and drives the generator 22, the differentiating circuit 23, and applies a force to the gravity-meter mass 45 in the same manner as shown in Figure 3. While the difficulty of compensation accurate enough for geophysical surveying purposes is even greater in this application than in the case of the vessel 10, it is still possible to make readings of the variations of the earth's gravitational field of sufficient accuracy for other purposes.

While I have described my invention in terms of the foregoing specific embodiments and modifications, it is obvious that many further embodiments and modifications are possible and will occur to those skilled in the art. The invention therefore should not be considered as limited to systems with the exact details described but is rather to be ascertained from the scope of the appended claims.

I claim:

1. The method of compensating a gravity-positioned mass mounted on a carrier adapted to travel through and be supported solely by a fluid medium, for accelerations of said carrier causing movement of said mass relative thereto due to the mass inertia comprising the steps of substantially continuously measuring through said medium the distance from said carrier to a reference position fixed relative to the earth, differentiating the distance measurement so obtained twice with respect to time to obtain the acceleration of said carrier relative to said fixed position, generating a mechanical force proportional to said acceleration, and applying said force to said mass in a direction to oppose its movements relative to said carrier due to accelerations of the carrier.

2. The method of compensating a gravity-responsive mass mounted on a carrier adapted to travel through and be supported solely by a fluid medium, for accelerations of said carrier causing movement of said mass relative thereto due to the mass inertia comprising the steps of substantially continuously measuring through said medium the distance of said carrier from a fixed reference point, electrically differentiating the distance measurement so obtained twice with respect to time to obtain an electrical signal proportional to the acceleration of said carrier relative to said point, and applying a force proportional to said electrical acceleration signal to the freely suspended portion of said gravity-responsive system to reduce substantially its displacement by the accelerations of said carrier.

3. An acceleration-compensated system comprising a gravity-responsive mass, a carrier adapted to be supported solely by a fluid medium while traveling therethrough and transporting said mass, said carrier being subject to accelerations causing movements of said mass relative to said carrier due to the mass inertia, means on said carrier for substantially continuously measuring through said medium the distance from said carrier to a reference position fixed relative to said fluid medium, means for producing an electric current proportional to the rate of change of said distance in the direction of movement of said mass relative to said carrier, means for electrically differentiating said current to produce a signal proportional to the carrier accelerations in said direction, and means actuated by said acceleration signal for applying between said carrier and said mass a force opposing the inertia force causing said movements of said mass.

4. An acceleration-compensated system adapted for transportation by a carrier through a fluid medium which constitutes the sole support for said carrier comprising a pivoted gravity-responsive mass mounted on said carrier, means in said carrier for substantially continuously measuring through said medium the distance from said carrier to a reference position on the earth's surface in a direction perpendicular to the axis of rotation and to the pendulum arm of said mass, means for electrically differentiating said distance measurement twice to produce an electrical signal proportional to the acceleration of said carrier relative to said reference position, and means responsive to said signal for applying to said mass a force opposing its tendency to rotate relative to said carrier due to the mass inertia.

5. An acceleration-compensated marine gravity-meter system comprising a marine vessel, a gravity meter mounted on said vessel including a mass and a spring supporting said mass and attached to said vessel, means on said vessel for substantially continuously measuring the vertical distance from said vessel to the marine floor, means actuated by said distance-measuring means for producing an electric current proportional to the rate of change of said distance, means for electrically differentiating said current to produce a signal proportional to the vertical accelerations of said vessel, and means actuated by said signal for applying to said mass a varying force opposing its tendency to move relative to said vessel due to the mass inertia.

6. An acceleration-compensated marine gravity-meter system comprising a marine vessel, a gravity meter mounted on said vessel including a mass and a spring supporting said mass and attached to said vessel, an acoustic depth sounder on said vessel adapted to measure the vertical distance between said vessel and the marine floor, means for indicating said distance, means actuated from said distance-indicating means to produce an electrical current proportional to the rate of change of said distance, means for electrically differentiating said output to produce a signal proportional to the vertical accelerations of said vessel, and means actuated by said signal for applying to said mass a varying force opposing its tendency to move relative to said vessel due to the mass inertia.

7. An acceleration-compensated marine gravity-meter system comprising a marine vessel, a gravity meter on said vessel including a mass and a spring supporting said mass and attached to said vessel, a sounding weight, a sounding line connected to said weight, a reel for said sounding line mounted on said vessel, means for applying torque to said reel to maintain said sounding line in tension, generator means coupled to said reel for producing an electrical output proportional to the velocity of rotation of said reel, means for electrically differentiating said output to produce a signal proportional to the vertical accelerations of said vessel, and means actuated by said signal for applying to said mass a varying force opposing its tendency to move relative to said vessel due to the mass inertia.

8. An acceleration-compensated pendulum system adapted for transportation by an aircraft comprising a pendulum mounted on an aircraft, radio-wave distance-measuring means carried by said craft for measuring the horizontal distance of said craft from a reference location on the earth's surface, means for producing an indication of said distance, a servo-follower actuated from said distance-indication means, an electric generator coupled to said follower and producing an electrical output proportional to the rate of change of said distance, means for electrically differentiating said output to produce a signal proportional to the acceleration of said aircraft in a horizontal direction, and means actuated by said acceleration signal for applying to said pendulum a varying force opposing its tendency to rotate relative to said aircraft due to the inertia of the pendulum mass.

9. An acceleration-compensated, gravity-meter system adapted for transportation by an aircraft comprising a pivoted gravity-responsive mass mounted in said craft and suspended by a spring, means in said craft for substantially continuously measuring the altitude of said craft above a reference plane, means for indicating said altitude, a servo-follower actuated by said indicating means, an electric generator coupled to said follower and producing an output proportional to the rate of change of altitude, means for electrically differentiating said output to produce a signal proportional to the vertical accelerations of said aircraft, and means actuated by said acceleration signal for applying to said mass a varying force opposing its tendency to rotate relative to said aircraft due to the mass inertia.

DANIEL SILVERMAN.

References Cited in the file of this patent

UNITED STATES PATENTS

| Number | Name | Date |
| --- | --- | --- |
| 2,362,616 | Cloud | Nov. 14, 1944 |
| 2,589,710 | La Coste et al. | Mar. 18, 1952 |

FOREIGN PATENTS

| Number | Country | Date |
| --- | --- | --- |
| 571,613 | Great Britain | Aug. 31, 1945 |